United States Patent [19]

Lun

[11] Patent Number: 4,854,560

[45] Date of Patent: Aug. 8, 1989

[54] HYDRAULIC MOUNT WITH RECIPROCAL PARTITION

[75] Inventor: Saiman Lun, Englewood, Ohio

[73] Assignee: General Motors Corporation, Detroit, Mich.

[21] Appl. No.: 185,642

[22] Filed: Apr. 25, 1988

[51] Int. Cl.⁴ .................. F16M 5/00; F16M 13/00; F16F 7/10
[52] U.S. Cl. ..................... 267/140.1; 188/378; 248/559; 248/562; 267/219
[58] Field of Search ............. 267/113, 35, 124, 140.1, 267/219; 188/378; 180/300, 312; 248/559, 562, 636, 638; 123/192 R, 195 A

[56] References Cited

U.S. PATENT DOCUMENTS

| | | | |
|---|---|---|---|
| 4,570,911 | 2/1986 | Konishi | 267/219 |
| 4,588,173 | 5/1986 | Gold et al. | 267/140.1 |
| 4,611,795 | 9/1986 | Muzechuk | 267/140.1 |
| 4,621,795 | 11/1986 | Eberhard et al. | 267/219 |

FOREIGN PATENT DOCUMENTS

| | | | |
|---|---|---|---|
| 0084430 | 4/1986 | Japan | 267/140.1 |
| 0189341 | 8/1986 | Japan | 267/140.1 |

*Primary Examiner*—Robert J. Oberleitner
*Attorney, Agent, or Firm*—R. L. Phillips

[57] ABSTRACT

A hydraulic mount has a pair of mounting members, an elastomeric body that connects the mounting members, an elastomeric diaphragm that is connected to one of the members and cooperates with the body to define a closed cavity, and a partition that divides the cavity into a chamber enclosed on one side by the partition and the elastomeric body and another chamber that is enclosed on one side by the partition and the diaphragm. A liquid fills the chambers and a damping orifice connects the chamber to provide damping by throttling liquid flow therethrough. The partition comprises a rigid singular imperforate body that is mounted at a cylindrical surface thereof for unrestrained reciprocal movement within prescribed limits in an interior cylindrical wall of one of the mounting members thereby to effect limited cyclic volume change in the chambers so that the liquid is not then forced through the damping orifice.

3 Claims, 1 Drawing Sheet

12
HYDRAULIC MOUNT WITH RECIPROCAL PARTITION

TECHNICAL FIELD

This invention relates to hydraulic mounts and more particularly to the partition separating the chambers therein.

BACKGROUND OF THE INVENTION

In hydraulic mounts such as those used in motor vehicle engine mounting systems, the mount normally comprises a pair of mounting members, an elastomeric body, an elastomeric diaphragm, a decoupler and a damping orifice. The elastomeric body connects the mounting members and the diaphragm which is connected to only one of the mounting members cooperates with the elastomeric body to define a closed cavity. The partition divides the cavity into a chamber that is enclosed by one side of the partition and the elastomeric body and another chamber that is enclosed by the other side of the partition and the diaphragm. A liquid fills the chambers and the damping orifice connects these chambers to provide a damping effect by throttling the flow passing therethrough.

In such hydraulic engine mounts, it is desirable to eliminate damping at small engine displacements such as caused by high speed road transmitted vibrations. This is normally accomplished by the decoupler which is typically mounted for unrestrained reciprocal movement within prescribed limits on the partition and is open on opposite sides thereof to the chambers thereby to effect limited cyclic volume change in the chambers so as to then not force flow between the chambers through the damping orifice. In addition, it has also been the practice to allow some restrained movement of the entire partition to supplement the decoupling effect provided by the decoupler. For example, see U.S. Pat. Nos. 4,588,173 and 4,611,795 assigned to the assignee of the present invention which disclose the various details of such prior hydraulic engine mount designs.

SUMMARY OF THE INVENTION

An object of the present invention is to reduce the number of required components in such a hydraulic mount to thereby reduce costs and assembly time and also ease the detection of assembly errors. This is accomplished by eliminating the separate decoupler and in its place making the partition a rigid singular imperforate body that provides the only separation between the chambers and in addition has a cylindrical surface by which same is mounted for unrestrained reciprocal movement within prescribed limits in a cylindrical wall on one of the mounting members. The partition is thus free to effect limited cyclic volume change in the chambers while maintaining their separation and with the damping orifice then made to bypass flow around rather than through the partition to provide damping only above the limited free movement of the thus combined partition and singular decoupler. Preferably, the partition is constructed with a damping orifice as disclosed in applicant's copending application Ser. No. 185,641 filed Apr. 25, 1987 concurrently herewith.

These and other objects, advantages and features of the present invention will become more apparent from the following description and drawing in which:

DETAILED DESCRIPTION OF PREFERRED EMBODIMENT

Figure 1:
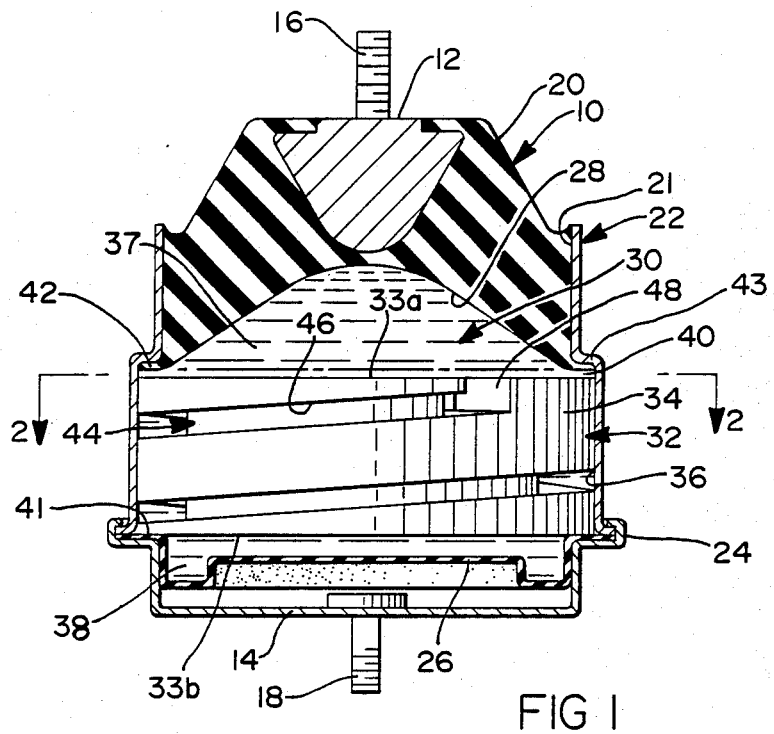
FIG. 1 is a view partly in section of a preferred embodiment of a hydraulic mount constructed according to the present invention.
Figure 2:
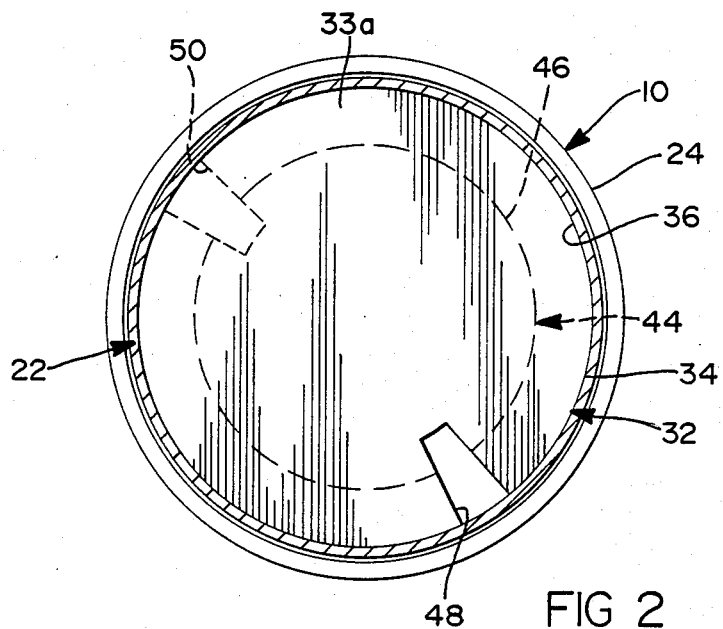
FIG. 2 is a view taken along the line 2—2 in FIG. 1.

Referring to FIG. 1, the hydraulic mount 10 thereshown is adapted to operate as one of several mounts in a motor vehicle engine mounting system and for that purpose has a pair of mounting members 12 and 14 each having a stud 16 and 18 by which the mount is connected to the vehicle's engine and frame or other supporting structure (not shown). In addition to the mounting members 12 and 14, the mount comprises an elastomeric body 20 that is bonded to the exterior of the upper mounting member 12 and to an interior wall 21 of a stepped cylinder or sleeve 22 that is mechanically joined to the lower mounting member 14 by an annular crimped connection 24. An elastomeric diaphragm 26 is sealingly connected about its perimeter to the lower mounting member 14 by being sandwiched in the crimped connection 24 and cooperates with a concave side 28 of the elastomeric body 20 to define a closed cavity generally designated as 30. These members are all generally right circular cylindrically shaped as seen in FIG. 2.

A rigid right circular cylindrical, singular, imperforate, combination partition and decoupler body 32 with parallel flat ends 33A and 33B at right angles to the axis of this body is mounted at and by a cylindrical surface 34 thereon for unrestrained reciprocal movement within prescribed limits in the larger diameter interior cylindrical wall 36 of the intermediate sleeve 22. The side clearance between the combined partition and decoupler body 32 and the wall 36 is made small enough so that the former at its flat ends 33A and 33B effectively divides the cavity into an upper chamber 37 and a lower chamber 38 respectively which are filled with a liquid having a low freezing temperature (e.g. conventional engine coolant anti-freeze solution). The axial dimension of the combination partition and decoupler 32 is less than that of the cylindrical wall section 36 leaving the clearance 40 seen in FIG. 1 to permit this free reciprocal movement which is from the down position shown in FIG. 1 where its lower peripheral edge seats on an annular portion 41 of the diaphragm that is supported by the lower mounting member to an up position where its upper peripheral edge seats on a flange 42 that is formed integral with the elastomeric body 20 and is supported or rigidly backed by the annular step 43 in the sleeve 22.

Movement of the combination partition and decoupler occurs for example when high speed road transmitted vibrations are such as to cause relative reciprocal movement between the mounting members 12 and 14 such that the upper chamber contracts and forces the body 32 downward and alternately the lower chamber contracts and forces this body upward within the prescribed limits of travel as determined by the axial end clearance 40 which may for example be ±0.1 mm.

Damping beyond such prescribed small displacements is provided by a damping orifice 44 that connects the two chambers 37 and 38 and provides damping by throttling the liquid flow therethrough between the chambers upon amplitudes above the free decoupler displacement amplitudes previously described. The damping orifice 44 may be provided by a tube that bypasses the combined partition and decoupler member 32 but is preferably formed by a spiral groove or channel 46 in the exterior 34 of this member. The groove 46 spirals about the member 32 from the upper end 33A thereof to the lower end 33B and cooperates with the interior wall 36 to define the damping orifice which opens at one end 48 to the upper chamber 37 and at its other end 50 to the lower chamber 38.

Preferably, the combined partition and decoupler member is made of molded plastic and because there is less total parts, there is a correspondent reduction in the assembly operation as well as reduced parts cost. Moreover, any errors can be readily detected in the mounting of the single part as opposed to several parts in the formation of both the partition that totally separates the two chambers as well as a decoupler that provides for cyclic volumetric change therein.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A hydraulic mount comprising a pair of mounting members, an elastomeric body connecting said members, an elastomeric diaphragm connected to one of said members and cooperating with said elastomeric body to define a closed cavity, a partition dividing said cavity into a chamber that is enclosed by one side of said partition and said elastomeric body and another chamber that is enclosed by the other side of said partition and said diaphragm, a liquid filling said chambers, and a damping orifice connecting said chambers, characterized by a cylindrical sleeve interconnecting said elastomeric body and said one mounting member and also sealingly peripherally clamping said diaphragm to said one mounting member independent of the partition, said partition comprising a rigid singular body coextensive with said chambers mounted at an annular surface thereof for unrestrained reciprocal movement between spaced stops in an interior annular wall on said sleeve thereby to solely separate said chambers and effect limited cyclic volumetric change in said chambers so that the liquid then is not forced to flow through said damping orifice.

2. A hydraulic mount comprising a pair of mounting members, an elastomeric body connecting said members, an elastomeric diaphragm connected to one of said members and cooperating with said elastomeric body to define a closed cavity, a partition dividing said cavity into a chamber that is enclosed by one side of said partition and said elastomeric body and another chamber that is enclosed by the other side of said partition and said diaphragm, a liquid filling said chambers, and a damping orifice connecting said chambers, characterized by a cylindrical sleeve interconnecting said elastomeric body and said one mounting member and also sealingly peripherally clamping said diaphragm to said one mounting member independent of the partition, said partition comprising a rigid singular cylindrical body coextensive with said chambers mounted at a cylindrical surface thereof for unrestrained reciprocal movement between spaced stops in an interior cylindrical wall on said sleeve thereby to solely separate said chambers and effect limited cyclic volumetric change in said chambers so that the liquid is then not forced to flow through said damping orifice, a flange rigidly backed by said one mounting member and integral with said elastomeric body defining one of said stops, an annular portion rigidly backed by said sleeve and integral with said diaphragm defining the other of said stops.

3. A hydraulic mount as defined in claim 2 further characterized by said cylindrical sleeve and said partitions being right circular cylindrical parts.

* * * * *